United States Patent [19]

Kano et al.

[11] Patent Number: 4,835,603

[45] Date of Patent: May 30, 1989

[54] COLOR IMAGE REPRODUCTION APPARATUS AND A COMPOSITE LIGHT FILTER AND INK RIBBON FOR USE THEREIN

[75] Inventors: Hiroyuki Kano; Matsusaburo Noguchi; Joji Tadokoro, all of Tokyo, Japan

[73] Assignee: Oki Electric Industry Co., Ltd., Tokyo, Japan

[21] Appl. No.: 249,282

[22] Filed: Sep. 26, 1988

[30] Foreign Application Priority Data

Sep. 30, 1987 [JP] Japan .................. 62-249041

[51] Int. Cl.$^4$ .................. H04N 1/46; H04N 1/23; G03B 27/30; G03G 15/01
[52] U.S. Cl. .................. 358/75; 358/296; 346/76 PH; 346/106
[58] Field of Search .................. 358/75; 355/4; 346/76 PH; 400/240

[56] References Cited

U.S. PATENT DOCUMENTS

| 4,580,889 | 4/1986 | Hiranuma | 355/4 |
| 4,661,843 | 4/1987 | Sekizawa | 358/75 |
| 4,690,543 | 9/1987 | Watanabe | 355/4 |
| 4,761,670 | 8/1988 | Tanaka | 355/4 |

Primary Examiner—E. A. Goldberg
Assistant Examiner—Scott Rogers
Attorney, Agent, or Firm—Spencer & Frank

[57] ABSTRACT

A color image reproduction apparatus includes a light source, a filter, a sensor means, an ink ribbon, a printer including a printer head and a printer drive, a feeder and a controller. The light source illuminates spots on the color original and light reflected therefrom is filtered by one of three aligned segments of the filter which are connected end-to-end in an alignment direction which three segments respectively filter different first, second and third portions of the visual spectrum. The sensor is disposed behind the filter and senses the light filtered by one of the three different filter segments when the one of the segments is disposed in front of sensor. The sensor outputs an intensity signal indicating the intensity of the sensed light. The ink ribbon is fixed in relation to the filter and has three different color ink layers which are attached to each other end-to-end in the same alignment direction as are the light filter segments. Each ink layer is spaced a predetermined distance from a corresponding one of the three different filter segments. The printer head is disposed behind the ink ribbon and is spaced from the sensor a distance equal to the distance between corresponding ink layers and filter segments so as to be operable to apply ink from the ink layers to a print surface. The feeder successively feeds the three different filter segments across the front side of the sensor, and simultaneously successively feeds the three different ink layers across the front side of the printer head.

26 Claims, 7 Drawing Sheets

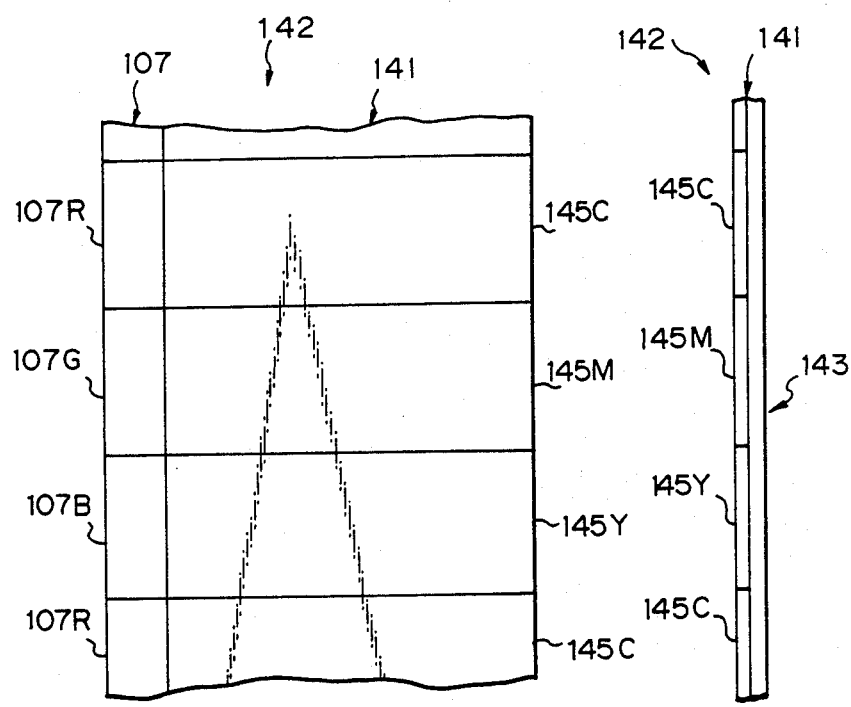
Fig. 2
Fig. 3
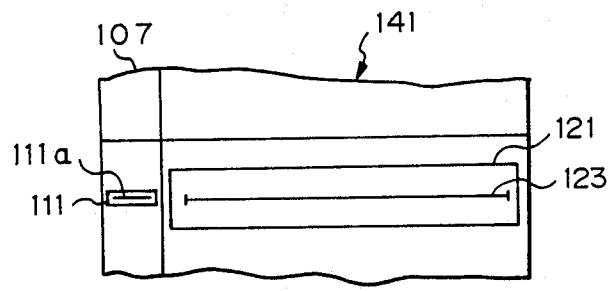
Fig. 4

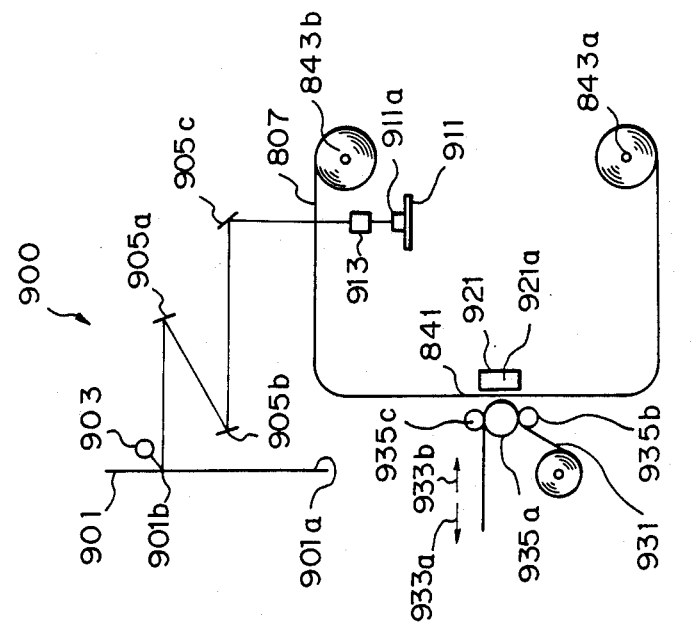
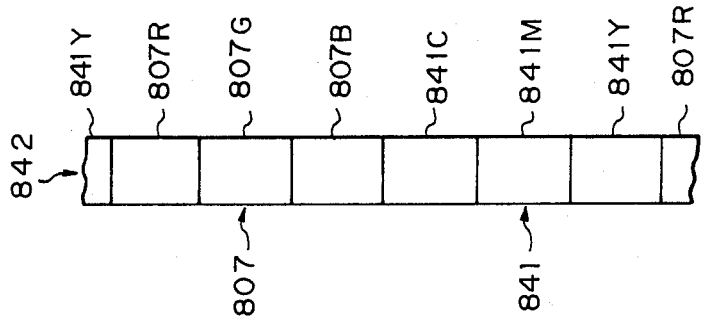

COLOR IMAGE REPRODUCTION APPARATUS AND A COMPOSITE LIGHT FILTER AND INK RIBBON FOR USE THEREIN

BACKGROUND OF THE INVENTION

The present invention relates a color image reproduction apparatus for producing a color copy of a color original and a composite light filter and ink ribbon for use therein.

In order to produce a color copy of a color original manuscript, a color image reproduction apparatus requires a color sensor for sensing the color image on the manuscript and a color printer for printing a copy of the color image. A conventional color image reproduction apparatus is described in detail in U.S. Pat. No. 4,580,889. The conventional color image reproduction apparatus employs a color sensor, and a color printer which is independently movable by separate drive, and further employs a controller for controlling the color sensor and the color printer. A beam from a light source scans a color manuscript and is successively reflected from sensed spots on the surface of the manuscript (color original) to the color sensor which outputs intensity signals indicating the intensity of the reflected light and sensed color signals indicating what colors are sensed at the spots. The controller receives those signals from the sensor and controls the timing and print color selection of the printer for printing a copy of each of the spots sensed on the manuscript, on a sheet of copy paper (print sheet) at successive spots predetermined to correspond to the sensed spots. The conventional color image reproduction apparatus can produce a polychromatic reproduction of a color image on the manuscript. Further improvement, however, has been desired to reduce the size of such an apparatus and simplify the control of the sensor and the printer.

SUMMARY OF THE INVENTION

Accordingly, it is an object of the present invention to simplify the control of a sensor and a printer.

It is another object of the present invention to reduce the size of a color image reproduction apparatus.

A color image reproduction apparatus of the invention, in order to produce a copy of a color original, includes a light source, a filter, a sensor, an ink ribbon, a printer having a printer head and a printer head drive, a feeder and a controller. The light source illuminates spots on the color original so as reflect light therefrom. The filter, which filters the reflected light, includes aligned first second and third light filter segments which are connected to one another end-to end and respectively filter different first, second and third portions of the visual spectrum from the reflected light when positioned in the path of the reflected light. The sensor is located behind the filter so as to sense the intensity of the filtered light. The sensor outputs an intensity signal indicating the intensity of the sensed light, to a controller which in turn controls the printer head drive. The ink ribbon is fixed in relation to the filter and has first, second and third color ink layers which are attached end-to-end in the direction of alignment of the filter segments so as to be respectively spaced a same predetermined distance from corresponding ones of the three different filter segments. The printer head is desposed behind the ink ribbon and spaced from the sensor a distance equal to the above predetermined distance, so as to be operable to apply ink from the color ink layers to a print surface. The feeder successively feeds the three different filter segments across the front side of the sensor and the three different ink layers across the front side of the printer head so that when the first light filter segment is positioned at the front side of the sensor, the first color ink layer is positioned at the front side of the printer head and so on. Accordingly, when one of the filter segments is in position to print a paticular color to be sensed by the sensor ink layers of the appropriate one of the three different ink layers is automatically in position for printing of that color on a print surface adjacent the ink layer. Therefore, the control of the sensor and the printer in accordance with the invention is simplified.

In accordance with another aspect of the invention, the apparatus has a common the feeder for the filter and ink ribbon which includes a supply roller, a take-up roller and a feeder drive. The ink ribbon and the filter are formed on a common base material and commonly wounded between the supply roller and takeup roller by the feeder drive. Thus structure reduces the manufacturing cost and the size of the apparatus in accordance with the invention.

BRIEF DESCRIPTION OF THE DRAWINGS

These and other features and advantages of the invention will be more completely understood from the following detailed description of the preferred embodiments with reference to the accompanying drawings in which:

FIG. 2 is a partial plan view of a composite sheet employed in the apparatus shown in FIG. 1.

FIG. 3 is a partial side view of the composite sheet shown in FIG. 2.

FIG. 4 is a schematic illustration of the relative positions of a printer, a sensor and the composite sheet employed in the apparatus shown in FIG. 1.

FIG. 8 is a partial plan view of a composite sheet according to another embodiment of the invention.

FIG. 9 is a schematic side view of part of another color image reproduction apparatus employing the composite sheet shown in FIG. 8.

DETAILED DESCRIPTION OF THE PREFERRED EMBODIMENTS

Figure 1:
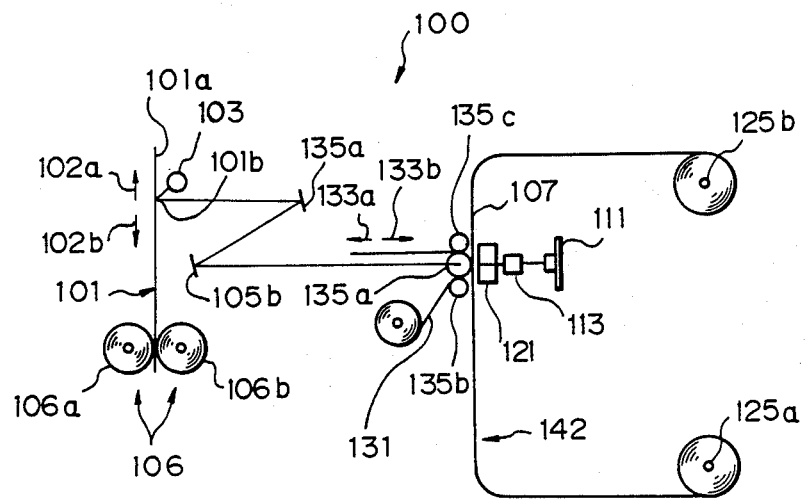
FIG. 1 is a schematic partial side view of a color image reproduction apparatus in accordance with the present invention.

Referring to FIG. 1, there is illustrated a schematic partial side view of a color image reproduction apparatus 100 embodying the present invention.

The apparatus 100 for producing a copy of a color image on a manuscript 101 employs a conventional stationary light source 103 for illuminating spots on a line portion 101b of the surface 101a of the manuscript 101 with a stationary line of white light which includes the separate colors, blue, red, yellow, cyan and magenta. The manuscript 101 can be fed in an upward direction 102a and a downward direction 102b by a manuscript feeder 106 which includes two manuscript rollers 106a and 106b. The line of light from the light source 103 is reflected by the surface 101a and mirrors 105a and 105b to a light filter 107. The light filter 107 is part of a flexible sheet 142 which is upward from a supply roller 125a to a take-up roller 125b. The light filter 107 filters the reflected light and transmits the filter light to a line sensor 111 such as a conventional charge coupled diode (CCD) array through a focusing optical lens 113. The line sensor 111 senses the line of filtered light and outputs signals indicating the intensity of the filtered light along the line to a conventional thermal printer 121. The thermal printer 121 prints a color image corresponding to the sensed line of the color original on a print sheet 131 with the use of an ink ribbon 141 formed as part of the composite sheet 142 with the filter 107, to be described below. The print sheet 131 can be fed in a forward direction 133a and a backward direction 133b by means of a platen roller 135a and two auxiliary rollers 135b and 135c.

Referring to FIG. 2, there is illustrated a partial plan view of composite sheet 142 including light filter 107 and the heat sensitive color transfer ribbon 141 according to the invention.

The light filter 107 is composed of successive flexible segments of different color transmissiveties, including a red light transmissive filter segments 107R, green light transmissive filter segments 107G and blue light transmissive filter segments 107B which respectively alternatively filter different portions of the visual spectrum of the light as following. The red light filter segments 107R substantially eliminate the intensity of the cyan color in the line of reflected light and passe the other beam colors, magenta and yellow which are components of red light. The green light filter segments 107G substantially eliminates the intensity of the magenta color in the line of reflected light and passe the other beam colors, cyan and yellow which are components of green light. The blue light filter segments 107B substantially eliminates the intensity of yellow in the line of reflected light and passes the other beam colors cyan and magenta which are components of blue light.

As shown in FIG. 3, the composite light filter and ink ribbon sheet 142 includes a thin flexible transparent polyester foundation or base 143 on which are successively and respectively formed in alignment cyan color ink layers 145C, magenta color layers 145M and yellow color ink layers 145V, side-by-side with the red, green and blue light filter segments 107R, 107G and 107B, respectively. The light filter segments 107R, 107G and 107B are formed on the foundation 143 as by a known printing process. The ink layers 145C, 145M and 145Y are formed of a known heat sensitive transfer ink composition and are formed on the polyester foundation in a known manner.

Figure 5:
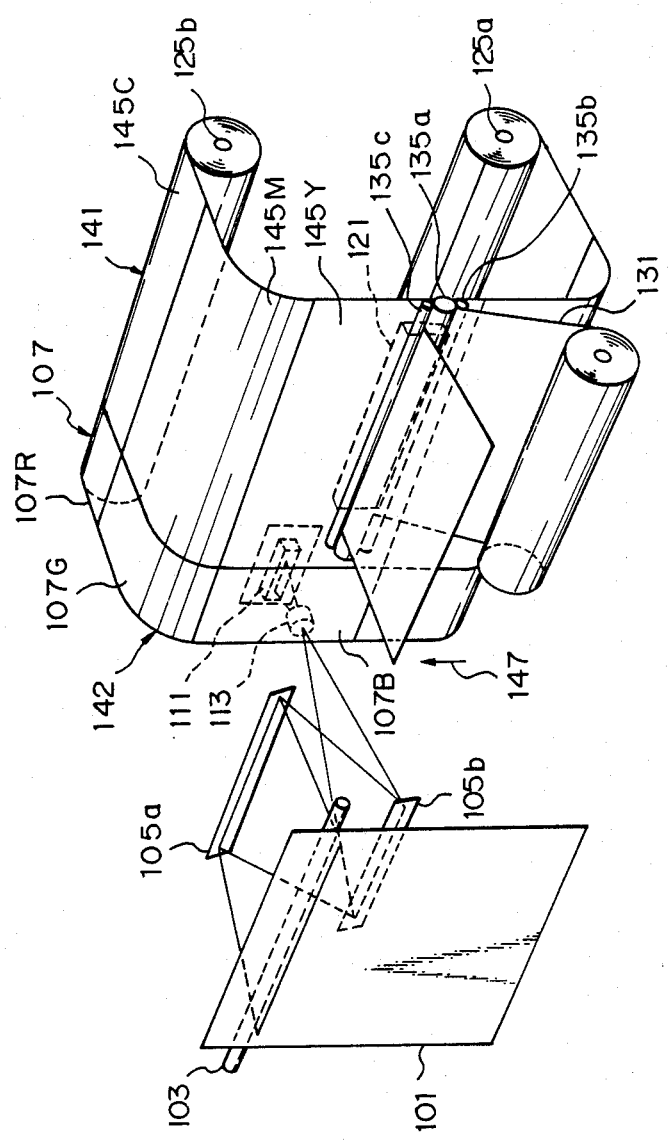
FIG. 5 is a schematic perspective view of part of the apparatus shown in FIG. 1.

As shown in FIG. 2, each of the different color ink layers 145C, 145M and 145Y have uniform widths and lengths which are larger than the width and lengths of the paper on which the copy is to be printed and are proportional to the width and length of the manuscript 101. As shown in FIG. 5, the heat sensitive color transfer ribbon 141 can transfer the ink of the different color layers 145C, 145M and 145Y to the surface of the copy paper 131 by application of heat by the thermal printer 121.

The different color light filter segments 107R, 107G and 107B which are horizontally aligned according to their color with the colors of the corresponding ink layers adjacent thereto, each has the same length as that of the different color ink layers, and a uniform width sufficient to receive the line of reflected light from the surface 101a. Each of the different color light filter segments have a side edge adhered to an adjacent side of the ribbon 141 parallel to the direction of alignment of the different color ink layers. The red color light filter segments 107R are disposed to one side of the cyan color ink layers 145C, the green color light filter segments 107G are disposed to one side of the magenta color ink layers 145M, and the blue color light filter segments 107B are disposed to one side of the yellow color ink layers 145Y.

Referring to FIG. 4, the line sensor 111 and the thermal printer 121 according to the invention are to be mounted in a frame of the apparatus so that a sensor array 111a of the line sensor 111 is disposed to the side of a thermal printer head 123 of the thermal printer 121 is horizontal alignment therewith.

Figure 6:
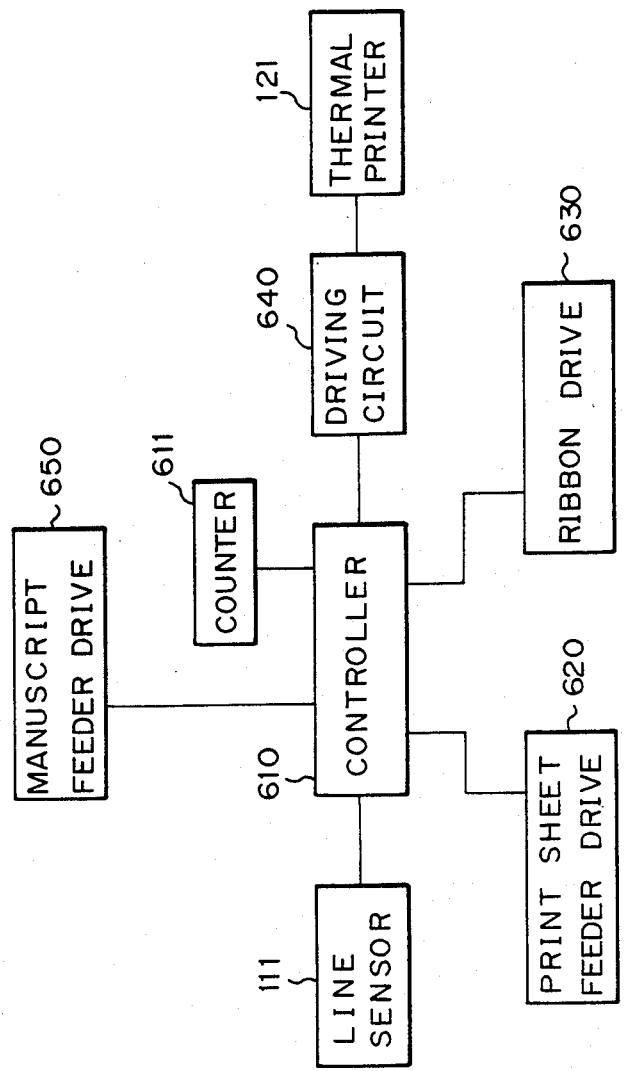
FIG. 6 is a block diagram of the apparatus shown in FIG. 1.

Referring to FIG. 6, there is illustrated a block diagram showing the electrical controls of the color image reproduction apparatus 100. A controller 610 is coupled to the line sensor 111, a conventional manuscript feeder drive 650 which drives the rollers 106a and 106b, a conventional print sheet feeder drive 620 which drives the platen roller 135a, a conventional ribbon drive 630 which drives the take up roller 125a, a conventional driving circuit for the thermal printer 121 and a conventional counter 611.

Figure 7A:
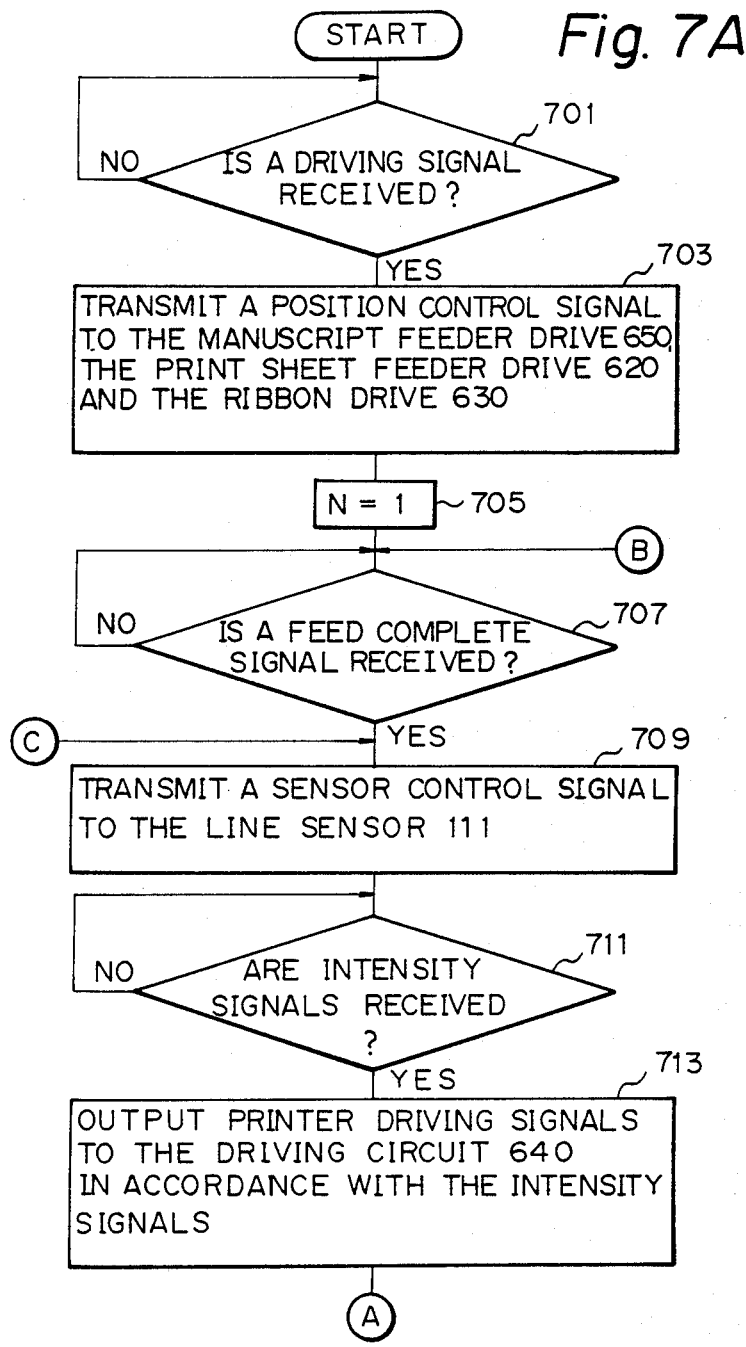
FIGS. 7A and 7B show a flow chart of a controller employed in the apparatus shown in FIG. 1.
Figure 7B:
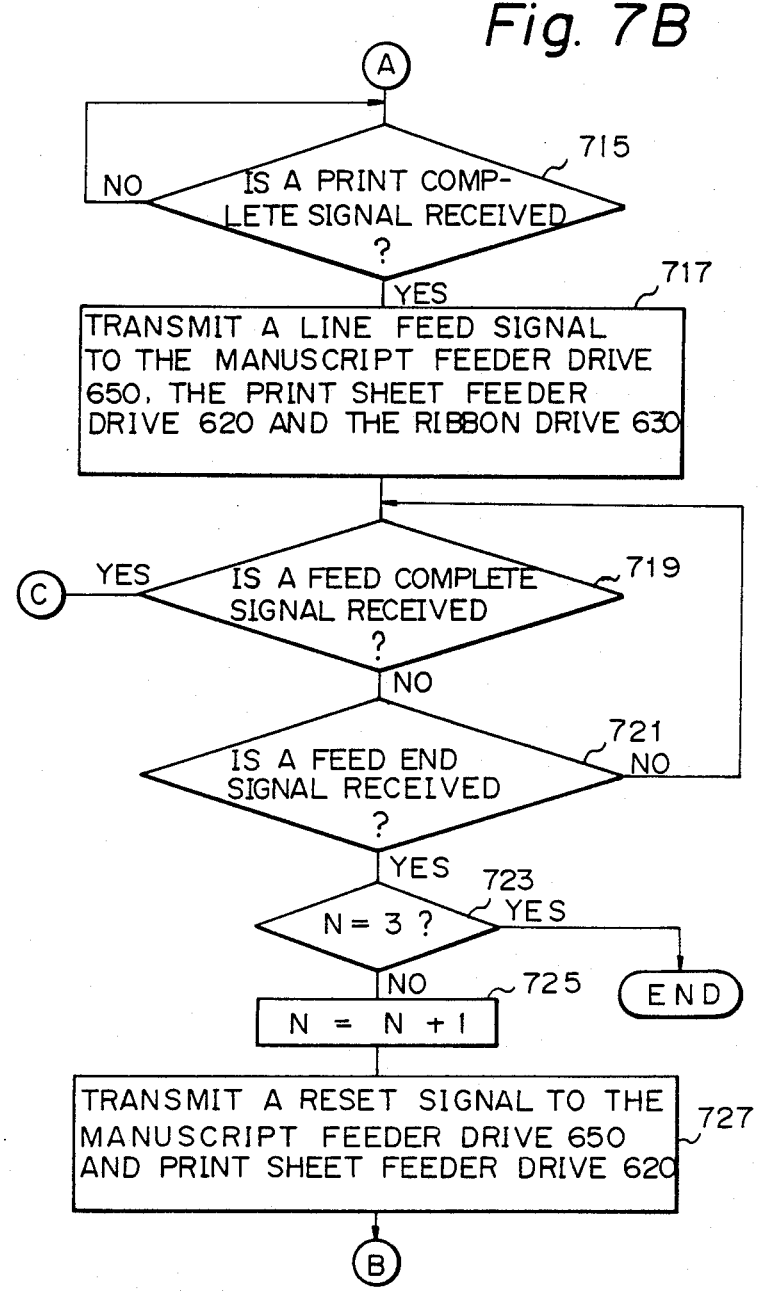

Referring also to FIG. 7, in a first step 701 of operation of the apparatus 100, the controller 610 receives drive signal from a drive switch (not shown). In step 703, the controller 610 transmits position control signals to each of the manuscript feeder drive 650 the print sheet feeder drive 620 and the ribbon drive 630 and in step 705 sets a value N of the counter 611 at 1.

The manuscript feeder drive 650 upon receiving the position control signal drives the two manuscript rollers 106a and 106b so as to feed the manuscript 101 until the sensor 111 can sense the line of reflected flight from the first read line the surface of the manuscript 101. After feeding the manuscript 101, the manuscript feeder drive 650 outputs a feed complete signal to the controller 610 which detects this signal in step 707. The print sheet feeder drive 620 upon receiving the position control signal simultaneously with the initial feeding of the manuscript 101 by manuscript rollers 106a and 106b, feeds the print sheet 131 so that the first print line of the print sheet 135 corresponding to the first read line of the color original on the manuscript 101 is positioned in front of the thermal print head 123. The ribbon drive 630 upon receiving the position control signal also simultaneously with the initial feeding of the manuscript 101, feeds the flexible sheet 142 so that the top portion of the cyan color ink layer 145 of ribbon 141 is positioned in front of the thermal print head 123 and the top portion of the red color filter segment 107R is positioned in front of the line sensor 111.

After the controller 610 receives the feed complete signal in step 707, the controller 610 transmits in step 709 a sensor control signal to the line sensor 111.

The sensor array 111a senses the line of light reflected from the red line through the light filter 141 and the focusing optical lens 113 and stores intensity signals indicating the intensity of the filtered light at successive points along the line, and the line sensor 111 upon receiving the sensor control signal transmits the stored intensity signals to the controller 610.

After the controller 610 receives the intensity signals in step 711, the controller 610 compares in step 713 each of the intensity signals with a predetermined threshold level and outputs printer driving signals to a driving circuit 640 for those intensity signals which are below the predetermined threshold level.

The driving circuit 640 actuates the thermal head 123 of the thermal printer 121 in a conventional manner as for example is disclosed in U. S. Pat. No. 4,587,568 so that the thermal head will print the color (cyan) at the spots of the print line on the surface of the print sheet corresponding to those spots of the first read line of the manuscript 101 having sufficient cyan that the red color filter segment which filters out cyan color light substantially eliminates the intensity of the corresponding portion of the line of reflected light below a level at which the corresponding output of the sensor 111 to the controller 610 is below the threshold. The driving circuit 640 detects that the thermal printer head 123 has finished printing the line of cyan color on the print line and outputs a print complete signal to the controller 610.

After the controller 610 detects receipt of the print complete signal in a step 715, the controller 610 in a step 717 transmits a line feed signal to the manuscript feeder drive 650, the print sheet feeder drive 620 and the ribbon drive 630.

The print sheet feeder drive 620 upon receiving the line feed signal simultaneously feeds the print sheet 131 so that the next print line of the print paper 131 can be positioned in front of the print head 123, and the ribbon drive 630 likewise simultaneously feeds the sheet 142 so that the successive portion of the color ink layer of ribbon 121 can be positioned in front of the thermal print head 123.

The manuscript feeder drive 650 upon receiving the line feed signal feeds the manuscript 101 so that the line sensor 111 can sense the reflected light from the next successive read line on the surface of the manuscript 101. If the manuscript feeder drive 650 now detects the end of the manuscript 101, the manuscript feeder drive 650 outputs a feed end signal to the controller 610, detected by the controller 610 in a step 721; otherwise the manuscript feeder drive 650 outputs the feed complete signal to the controller 610, detected by the controller 610 in a step 719. If the controller 610 detects receipt of the feed complete signal in the step 719, the controller 610 operates to control repetition of preceding steps 709 to 719 to copy the cyan color over successive lines of the manuscript 101 until the last lines of the manuscript 101 is reached and a feed end signal is received in step 721. When the controller 610 detects receipt of the feed end signal in the step 721, the controller 610 at a step 723 queries whether N=3, which it is not at this point, at a step 725 adds 1 in the value N of the color counter 611 which now becomes 2, and in step 727 transmits a consecutive color print signal to the manuscript feeder drive 650 and the print sheet feeder drive 620 in response to which the manuscript feeder drive 650 drives the manuscript feeder 106 to feed back the manuscript 101 to a position in which the light source reflects the line of light off the first line print line 101b, and simultoneously the print sheet feeder drive 620 feeds back the print sheet so that the first print line of the print sheet 131 is positioned in front of the thermal print head 123. The controller 610 then repeats execution of the steps 707 to 727, and then again steps 707 to 723, to overlay the magenta ink color from the ink layer 145M and then the yellow ink color from ink ribbon segment 145Y onto the print paper 131.

In more detail, the particular filter segments and ink ribbon layers reproduce on the copy sheet 131 the color original on the manuscript as follows:

(1) Cyan color reproduction steps:

The red color light filter sheet segment 107R is positioned in frot of the line sensor 111 and then the filtered light sensed by the sensor 111 has little cyan color light as mentioned above. Therefore, the controller 610 upon receiving the intensity signal from the line sensor 111 judges for each spot in the line on the manuscript 101 from which the line of reflected and filtered light originated that the color of the spot is cyan color when the intensity signal is below a predetermined threshold level, and actuates the thermal printer head 123 of the thermal printer 121 to print at those points on a line on the print sheet 131 which correspond to those intensity signals. When the thermal printer head 123 is actuated, the printer 121 is able to print without the need to separately feed the ribbon 141 because the cyan color ink layer 145C is fixed to the side of the red color light filter sheet 107R so as to be positioned in front of the thermal printer head 123.

(2) magenta color reproduction steps:

Following the cyan color reproduction steps, following the step 727 of the controller 620, the green color light filter sheet segment 107G is fed with the sheet 142 by the ribbon drive 630 to a position in front of the line sensor 111 and then the line of reflected and filtered light sensed by the sensor 111 has little magenta color light as metnioned above. Therefore, the controller 610 upon receiving the intensity signal from the line sensor 111 judges for each spot in the line on the manuscript 101 from which the line of reflected and filtered light originated that the color of the spot is a magenta color when the intensity signal is below a predetermined threshold level, and actuates the thermal printer head 123 of the thermal printer 121 to print at those points on a line on the print sheet 131 which correspond to those intensity signals, just as in the cyan color reproduction steps, the color printed being magenta since the magenta color ink layer 145M is fixed the side of the green color light filter sheet 107G so as to be positioned in front of the thermal printer head 123.

(3) yellow color reproduction steps:

Following the magenta color reproduction step, again following step 727 of the controller 620, the blue color light filter sheet 107B is fed with sheet 142 by the ribbon drive 630 to a position in front of the line sensor 111 and then the line of reflected and filtered light sensed by the sensor 111 has little yellow color light as mentioned above. Therefore, the controller 610 upon receiving the intensity signal from the line sensor 111 judges for each spot in the line on the manuscript 101 from which the line of reflected and filtered light originated that the color of the spot is a yellow color when the intensity signal is below a predetermined threshold level, and actuates the thermal printer head 123 of the thermal printer 121 to print at those points on a line on the print sheet 131 which correspond to those intensity signals, just as in the cyan and magenta color reproduction steps, the color printed being yellow since the yellow color ink layer 145Y is fixed to the side of the blue color light filter sheet 107B so as to be positioned in front of the thermal printer head 123.

A copy of a color original can be produced by the above described three sets of reproduction steps. Further, the intensity of the filtered light from a black color of the color original will alway be below the predetermined threshold level for any of the color light filter sheet segments. Therefore, spots on the print sheet 131 corresponding to the black color spots on the manuscript 101 are colored with ink from by all of the cyan, magenta, yellow color ink layers 145C, 145M and 145Y to produce black spots.

Refering to FIG. 8, there is illustrated a partial plan view of a composite light filter and heat sensitive color transfer ribbon sheet 842 according to another embodiment of the invention.

The sheet 842 includes light filter portions 807 which each have a blue color light filter sheet segment 807B, a green color light filter sheet segment 807G and a red color ligth filter sheet segment 807R connected end-to-end in the stated order. The sheet also includes ink ribbon portions 841 which each have a yellow color ink layer segments 841Y, a magenta color ink layer segment 841M and a cyan color ink layer segment 841C connected end-to-end in the stated order. Further, the light filter portions 807 and the ink ribbon portions 841 are connected endto-end in alternating fashion. Each of the different color light filter sheets and the different color ink layers has a some predetermined width and a predetermined length.

Referring to FIG. 9, there is illustrated a schematic partial side view of the color image reproduction apparatus 900 employing the composite light filter and ink ribbon sheet 842 shown in FIG. 8.

The apparatus 900 for producing a copy of a color image on a manuscript 901 employs a fixed light source 903 of conventional design for illuminating a predetermined portion 901b of the surface 901a of the manuscript 901 with a horizontal line of white light including the colors, blue, red, yellow, cyan and magenta. The light from the ligth source 903 is reflected by the surface 901a and mirrors 905a, 905b and 905c to a light filter portion 807. The light filter portion filters the reflected light and transmits the filtered ligth to a conventional line sensor 911 fixed to a frame of the apparatus, through a focusing optical lens 913. The line sensor 911 has a line sensor array 911a, for example, a CCD array, which senses the filtered light and outputs, via a controller as in the first embodiment, signals indicating the intensity of the filtered light along the line, to a conventional thermal printer 921 which is fixed to the frame of the apparatus behind a layer of the ink ribbon portion corresponding to the segment of the filter portion through which the line of reflected light passes. The thermal printer 921 has a printer head 921a which prints a color image on a print sheet 931 by transferring the ink of the ink ribbon portion 841 to the surface of the print sheet 931. The print sheet 931 can be fed in a forward direction 933a and in a backward direction 933b by means of a platen roller 935a and two auxiliary rollers 935b and 935c. The distance between the line sensor array 911a and the printer head 921a is set so that when one of the different color light filter sheet segments is positioned in front of the line sensor array 911a, the corresponding color ink layer is positioned in fornt of the printer head 921a and the composite light filter and ink ribbon sheet 842 is fed by a feeder which includes a first reel 843a a second reel and 843b.

The other structure and operation of the above described second embodiment are substantially the same as that of the first embodiment, and the second embodiment can also produce a color copy of a color original by substantially the same three sets of color reproduction steps as described above with respect to the first embodiment.

The present disclosure relates to the subject matter disclosed in Japanese Patent Application No. 62-249041 filed on Sept. 30, 1987, the entire disclosure of which is in corporated by references.

It will be understood that the above description of the present invention s susceptible to various modifications, changes, and adaptations, and the same are intended to be comprehended within the meaning and range of equivalents of the appended claims. For example, the light filter of the invention may be composed of cyan color light filter sheet segments, magenta color light filter sheet segments and yellow color light filter sheet segments, whereby the cyan color light filter sheet segments reduce the intensity of red color in the line of reflected light, the magenta color light filter sheet segments reduce the intensity of green color in the line of reflected light and the yellow color light filter sheet segments reduce the intensity of a blue color in the line of reflected light, and thus a copy of the color original can be produced using red color ink layers, green color ink layers and blue color ink layers with an apparatus, otherwise the same as the first and second embodiments as described above.

Further, threshold levels to be compared to the intensity of the filtered light sensed by the line sensor may be individually adjustable so that the controller 610 may output to the printer the different intensity level signals in accordance with corresponding different threshold levels. This would permit the printer to print the color image with different concentrations of each of the respective color inks, thereby permitting the copy of the color original to be made a truer reproduction.

What is claimed is:

1. A color image reproduction apparatus for producing a copy of a color original, comprising:

a light source means for illuminating each of a plurality of spots on the color original with light so as to reflect the light therefrom;

a filter for filtering the light reflected from each of the spots on the color original, said filter including a first light filter segment, a second light filter segment and a third light filter segment for respectively alternatively filtering different first, second and third portions of the visual spectrum from the reflected light, said first, second and third light filter segments being attached end-to-end in a direction of alignment thereof;

sensor means having a front side behind said filter, for sensing the intensity of the light filtered by any one of said first, second and third light filter segments when the one of the segments is disposed at said front side of said sensor means and outputting an intensity signal indicating the intensity sensed thereby;

an ink ribbon fixed in relation to said filter and having a first color ink layer, a second color ink layer and a third color ink layer, said first, second and third color ink layers being attached end to end in said direction of alignment and being respectively spaced a predetermined distance from said first, second and third light filter segments;

printer head means having a front side, for printing a picture on a copy surface, said printer head means being spaced from said sensor means a distance equal to said predetermined distance;

feeder means for successively feeding said first, second and third light filter segments in said direction of alignment across said front side of said sensor means and said first, second and third color ink layers across said front side of said printer head means such that when said first light filter segment is positioned at said front side of said sensor means, said first color ink layer is positioned at front side of said printer head means, when said second light filter segment is positioned at said front side of said sensor means, said second color ink layer is positioned at said front side of said printer head means and when said third light filter segment is positioned at said front side of said sensor means, said third color ink layer is positioned at said front side of said printer head means; and means, responsive to said intensity signal, for actuating said printer head means to print ink from one of said first, second and third color ink layers at said front side of said print head means, onto the copy surface.

2. The apparatus according to claim 1, wherein said first, second and third light filter segments and said first, second and third color ink layers have equal length in said direction of alignment.

3. The apparatus according to claim 2, wherein said first, second and third light filter segments are respectively disposed side-by-side with said first, second and third color ink layers, said filter and said ink ribbon.

4. The apparatus according to claim 2, wherein said filter is attached to said ink ribbon end-to-end so as to be aligned with each other in said direction of alignment and wherein said sensor means and said printer head are aligned with each other in said direction of alignment.

5. The apparatus according to claim 1, wherein said first, second and third light filter segments respectively filter only the first portion, the second portion and the third portion of the visual spectrum from the light reflected from the color original.

6. The apparatus according to claim 5, wherein said actuating means is responsive to said intensity signal to actuate said printer head means only when the intensity signal is below a predetermined threshold level.

7. The apparatus according to claim 6, wherein said first light filter segment transmits only red light, said second light filter segment transmits only green light, said third light filter segment transmits only blue light, said first color ink layer is cyan, said second color ink layer is magenta, and said third color ink layer is yellow.

8. The apparatus according to claim 6, wherein said first light filter segment transmits only cyan light, said second light filter segment transmits only magenta light, said third light filter segment transmits only yellow light, said first color ink layer is red, said second color ink layer is green, and said third color ink layer is blue.

9. The apparatus according claim 1, wherein said filter and said ink ribbon comprise a single common flexible transparent polyester base, a first portion of said base having said first, second and third color ink layers disposed thereon, and a second portion of said base having said first, second and third light filter.

10. A color image reproduction apparatus for producing a copy of a color original, comprising:
means for illusminatig each of a plurality of spots on the color original with light so as to reflect the light therefrom;

a filter for filtering the light reflected from each of the spots on the color original, said filter including a first light filter segment, a second light filter segment and a third light filter segment, for respectively alternatively filtering different first, second and third portions of the visual spectrum from the reflected light, said first, second and third light filter segments being attached to each other end-to-end in a direction of alignment thereof and having equal length in said direction of alignment;

an ink ribbon having a first color ink layer, a second color ink layer and a third color ink layer, said first, second and third color ink layers being attached to each other end-to-end in said direction of alignment and each having length in said direction of alignment equal to said length of said first, second and third light filter segments;

sensor means having a front side behind said filter, for sensing the intensity of the light filtered by any one of said first, second and third light filter segments, when the one of said segments is disposed at said front side of said sensor means, and outputting an intensity signal indicating the intensity sensed thereby;

a printer head means, having a front side, for printing a picture on a copy surface, said printer head means being spaced from said sensor means by a predetermined distance in a given direction;

a supply roller and a take-up roller, said filter and said ink ribbon being wound onto said supply roller, with said first, second and third color ink layers respectively spaced in said given direction said predetermined distance from said first, second and third light filter segments;

feeder drive means for rotating at least one of said first supply roller and said take-up roller to successively feed said first, second and third light filter segment across said front side of said sensor means and said first, second and third color ink layers across said front of said printer head means, from said supply roller to said take-up roller, such that when said first, second and third light filter segments are respectively positioned at said front side of said sensor means, said first, second and third color ink layers are positioned at said front side of said printer means; and means, responsive to the intensity signal, for actuating said printer head means to print ink from one of said first, second and third segments at said front side of said print head means, onto the copy surface.

11. The apparatus according to claim 10, wherein said first, second and third light filter segments are respectively disposed side-by-side with said first, second and third color ink layers, said filter and said ink ribbon.

12. The apparatus according to claim 10, wherein said filter is attached to said ink ribbon end-to-end so as to be aligned with each other in said direction of alignment and wherein said sensor means and said printer head are aligned with each other in said direction of alignment.

13. The apparatus according to claim 10, wherein said first, second and third light filter segments respectively filter only the first portion, the second portion and the third portion of the visual spectrum from the light reflected from the color original.

14. The apparatus according to claim13, wherein said actuating means is responsive to said intensity signal to actuate said printer head means only when the intensity signal is below a predetermined threshold level.

15. The apparatus according to claim 14, wherein said first light filter segment transmits only red light, said second light filter segment transmits only green light, said third light filter segment transmits only blue light, said first color ink layer is cyan, said second color ink layer is magenta, and said third color ink layer is yellow.

16. The apparatus according to claim15, wherein said first light filter segment transmits only cyan light, said second light filter segment transmits only magenta light, said third light filter segment transmits only yellow light, said first color ink layer is red, said second color in layer is green, and said third color ink loyer is blue.

17. The apparatus according claim 10, wherein said filter and said ink ribbon comprise a single common flexible transparent polyester base, a first portion of said base having said first portion of said base having said first, second and third color ink layers disposed thereon, and a second portion of said base forming said first, second and third light filter.

18. A composite light filter and ink ribbon, for use in a color image reproduction appratus to filer light and supply ink to a printer head, comprising:
   a flexible transparent base having a first portion and a second portion and extending in a direction;
   a first filter, disposed on said first portion of said flexible transparent base, for filtering the light, said first filter including a first light filter segment, a second light filter segment and a third light filter segment, for respectively alternatively filtering different first, second and third portions of the visual spectrum of the light, said first, second and third light filter segments being aligned will each other in said direction and having equal length in said direction; and
   a first set of ink layers, disposed on said second portion of said flexible transparent base, including a first color ink layer, a second color ink layer and a third color ink layer, said first, second and third color ink layers being aligned with each other in said direction and each having a length in said direction equal to said length of said first, second and third light filter segments.

19. The composite light filter and ink ribbon according to claim 18, wherein said first, second and third light filter segments are respectively disposed side-by-side with said first, second and third color ink layers.

20. The composite light filter and ink ribbon according to claim 18, wherein said first filter is aligned with said first set of ink layers end-to-end in said direction.

21. The composite light filter and ink ribbon according to claim 18, wherein said first, second and third light filter segments respectively filter only the first portion, the second portion and the third portion of the visual spectrum of the light.

22. The composite light filter and ink ribbon according to claim 21, wherein said first light filter segment transmits only red light, said second light filter segment transmits only green light, said third light filter segment transmits only blue light, said first color ink layer is cyan, said second color ink layer is magenta, and said third color ink layer is yellow.

23. The composite light filter and ink ribbon according to claim 21, wherein said first light filter segment transmits only cyan light, said second light filter segment transmits only magenta light, said third light filter segment transmits only yellow light, said first color ink layer is red, said second color ink layer is green, and said third color ink layer is blue.

24. The composite light filter and ink ribbon according to claim 18, wherein said base is a thin polyester base.

25. The composite light filter and ink ribbon according to claim 18, further comprising a plurality of additional filters and a plurality of additional sets of ink layers, each of said additional filters being disposed on said base, and being aligned in said direction with and substantially identical to said first filter, each of said addtional sets of ink layers being aligned in said direction with and substantially identical to said first set of ink layers.

26. A color image reproduction aparatus for producing a copy of a color original, comprising:
   a composite light filter and ink ribbon, including
      a flexible transparent base having a first portion and a second portion and extending in a direction,
      a filter, disposed on said first portion of said flexible transparent base, for filtering the light, said filter including a fisrt light filter segment, a second light filter segment and a third light filter segment, for respectively alternatively filtering different first, second and third portions of the visual spectrum of the light, said first, second and third light filter segments being aligned with each other in said direction and having equal length in said direction, and
      ink layers, disposed on said second portion of said flexible transparent base, including a first color ink layer, a second color ink layer and a third color ink layer, said first, second and third color ink layers being aligned with each other in said direction and each having a length in said direction equal to said length of said first, second and third light filter segments;
   means for illuminating each of a plurality of spots on the color original with light so as to reflect the light therefrom and directing the reflected light through a selected one of said filter segments to be filtered thereby;
   sensor means for sensing the intensity of the light filtered by said one of said filter segments and outputting intensity signals indicating the intensity sensed thereby; and
   means responsive to said intensity signals for applying ink from one of said ink layers to spots on a copy surface corresponding to the spots on the color original.

* * * * *